United States Patent [19]
Sager

[11] Patent Number: 5,181,684
[45] Date of Patent: Jan. 26, 1993

[54] BICYCLE GENERATOR MOUNTING BRACKET

[75] Inventor: Paul Sager, Franklin, Mass.

[73] Assignee: Andrew Fischer, Boston, Mass.

[21] Appl. No.: 801,431

[22] Filed: Dec. 2, 1991

[51] Int. Cl.$^5$ ............................................. A47B 96/06
[52] U.S. Cl. .................... 248/231.6; 280/288.4; 24/335; 362/72
[58] Field of Search .............. 248/231.6, 231.8, 230, 248/316.6, 61, 62, 63, 68.1; 362/72, 193; 116/61; 310/75 C; 280/288.4, 293; 24/335, 457, 483, 484

[56] References Cited

U.S. PATENT DOCUMENTS

| | | | |
|---|---|---|---|
| 260,053 | 6/1882 | Sawyer | 280/293 |
| 526,798 | 10/1894 | Wise | 248/231.6 X |
| 582,070 | 5/1897 | Lester | 280/288.4 |
| 594,750 | 11/1897 | Moffat | 116/61 |
| 610,495 | 9/1898 | Noel | 116/61 |
| 643,095 | 2/1900 | Holdrege | 362/193 X |
| 810,651 | 1/1906 | Hofbauer | 362/193 X |
| 1,073,747 | 9/1913 | Eichert | 248/231.6 |
| 1,124,924 | 1/1915 | Leonard | 248/300 |
| 1,244,262 | 10/1917 | Deventer | 362/193 |
| 1,642,707 | 9/1927 | Wichert | 248/61 |
| 1,725,119 | 8/1929 | Williams | 248/61 |
| 2,462,969 | 3/1949 | Holliday | 24/335 X |
| 2,488,021 | 11/1949 | May | 310/75 C |
| 2,980,401 | 4/1961 | Witmor | 248/61 |
| 3,604,687 | 11/1971 | Moore | 403/400 X |
| 4,097,169 | 6/1978 | Kelly | 24/335 X |
| 4,270,724 | 6/1981 | McMullen | 248/231.6 X |
| 4,815,635 | 3/1989 | Porter | 280/288.4 X |
| 4,852,971 | 8/1989 | Kitrell | 280/288.4 X |

FOREIGN PATENT DOCUMENTS

| | | | |
|---|---|---|---|
| 58639 | 4/1941 | Denmark | 362/72 |
| 598747 | 5/1934 | Fed. Rep. of Germany | 362/72 |

*Primary Examiner*—Carl D. Friedman
*Assistant Examiner*—Korie Hung Chan
*Attorney, Agent, or Firm*—John M. Brandt

[57] ABSTRACT

A bicycle support bracket arranged to provide for top mounting of a generator over the rear wheel of a bicycle consisting of a pair of opposed tee shaped units having semi cylindrical cups at each end of the upright and cross member which cups are adapted to secure the bracket to the brake bridge and rear fork of the bicycle frame when the two tees are secured together.

1 Claim, 2 Drawing Sheets

BICYCLE GENERATOR MOUNTING BRACKET

BACKGROUND OF THE INVENTION

1. Field of the Invention

The invention resides in the field of mounting devices for auxiliary equipment for bicycles and more particularly relates to electric generator supports.

2. Description of the Prior Art

A Number of United States Patents disclose mounts or supports for generators or similar devices for bicycles. For example, U.S. Pat. No. 598,198, Dowd shows a generator arranged to be operated by the lateral surface of a front tire and attached to the front fork. Similarly U.S. Pat. No. 784,345, Pepper discloses a momentum retaining fly wheel attached to the rear fork by a bracket secured by four hooks. Also U.S. Pat. No. 810,651, Hofbauer describes a rear mounted generator attached to one side of the fork only. All of the above show brackets particularly suited for the individual devices they are intended to support. Additionally there are well known commercial units which attach to either the rear or front fork which position a generator to be operated by the by the side surface rather than the lateral surface of a tire. Other United States patents which contain material relating to wheel operated generators include U.S. Pat. No. 1,355,581, Van Deventer and U.S. Pat. No. 2,488,021, May. Further, U.S. Pat. No. 4,041,452, Maya and U.S. Pat. No. 4,103,924, Suham and U.S. Pat. No. 4,852,970, Kitrell all disclose mounts for various safety or signaling devices.

In contrast to the above, applicant's invention provides a universal mount allowing almost any of the currently available generator units to be mounted above the rear wheel and behind the seat in a manner to be operated by the top or lateral surface of the wheel.

Placing a generator in this position allows for engagement with the tire without stopping the bicycle, reduces the exposure to road dirt as compared to lower mounted side operated devices and ensures more even wear of the tire from the top rather than side operation and contact.

SUMMARY OF THE INVENTION

The invention may be summarized as a universal bicycle generator mounting bracket arranged to be positioned between the two seat support members of the rear fork and above the brake bridge of a bicycle frame. The configuration of this device is essentially a pair of opposed tee shaped members having cup ends to fit over the fork members and brake bridge mounting holes are formed in the upright tee portion and an assembly hole is formed in the cross portion for receiving a nut and bolt to clamp each tee member together and about the appropriate portion of the bicycle.

The advantages and features of the invention will be more fully appreciated from the description of the preferred embodiment and drawings which follow.

DESCRIPTION OF THE PREFERRED EMBODIMENT

Figure 1:
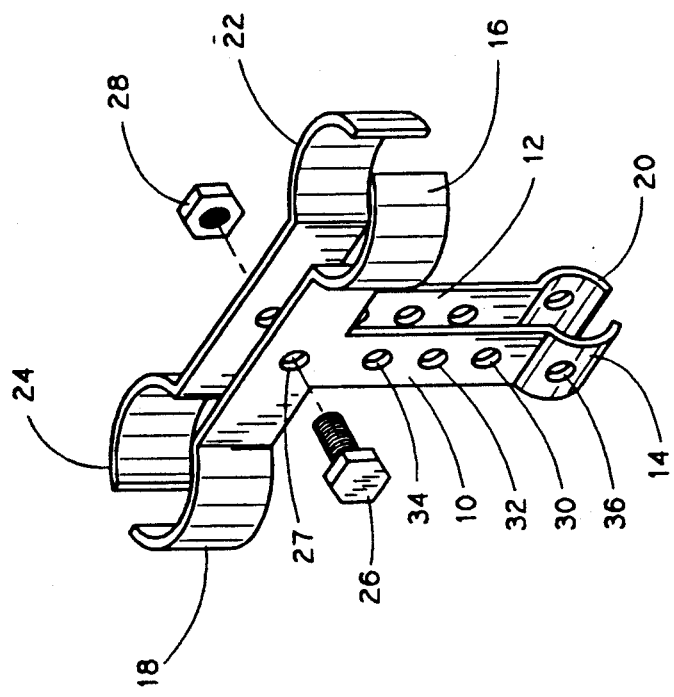
FIG. 1 is an exploded perspective view of the preferred embodiment of the invention.
Figure 2:
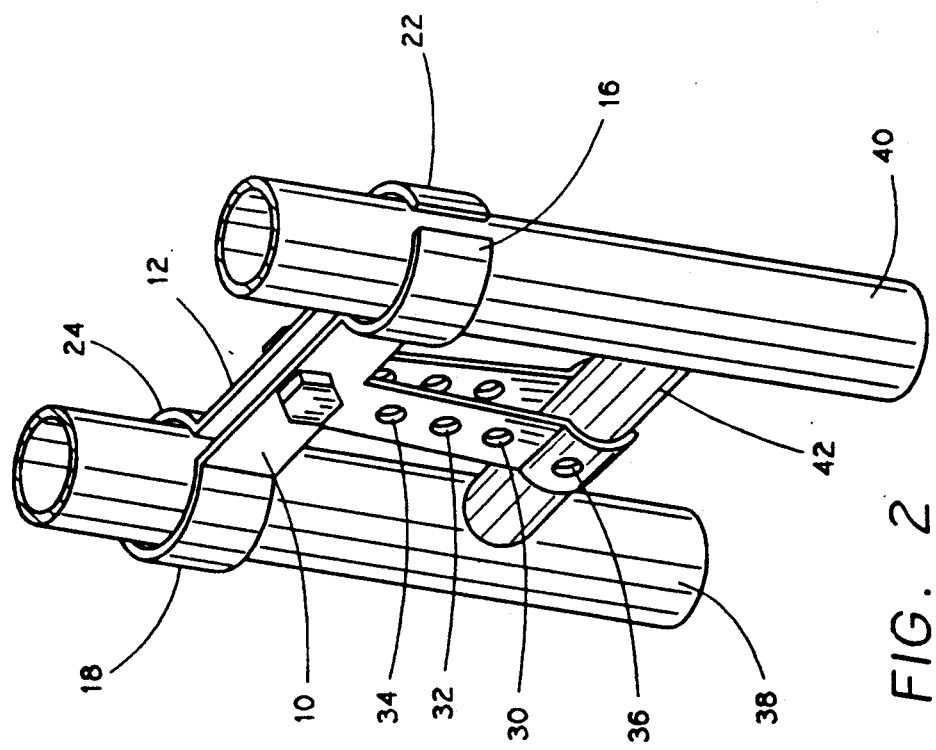
FIG. 2 is a perspective view of the embodiment of FIG. 1 installed on a bicycle.
Figure 3:
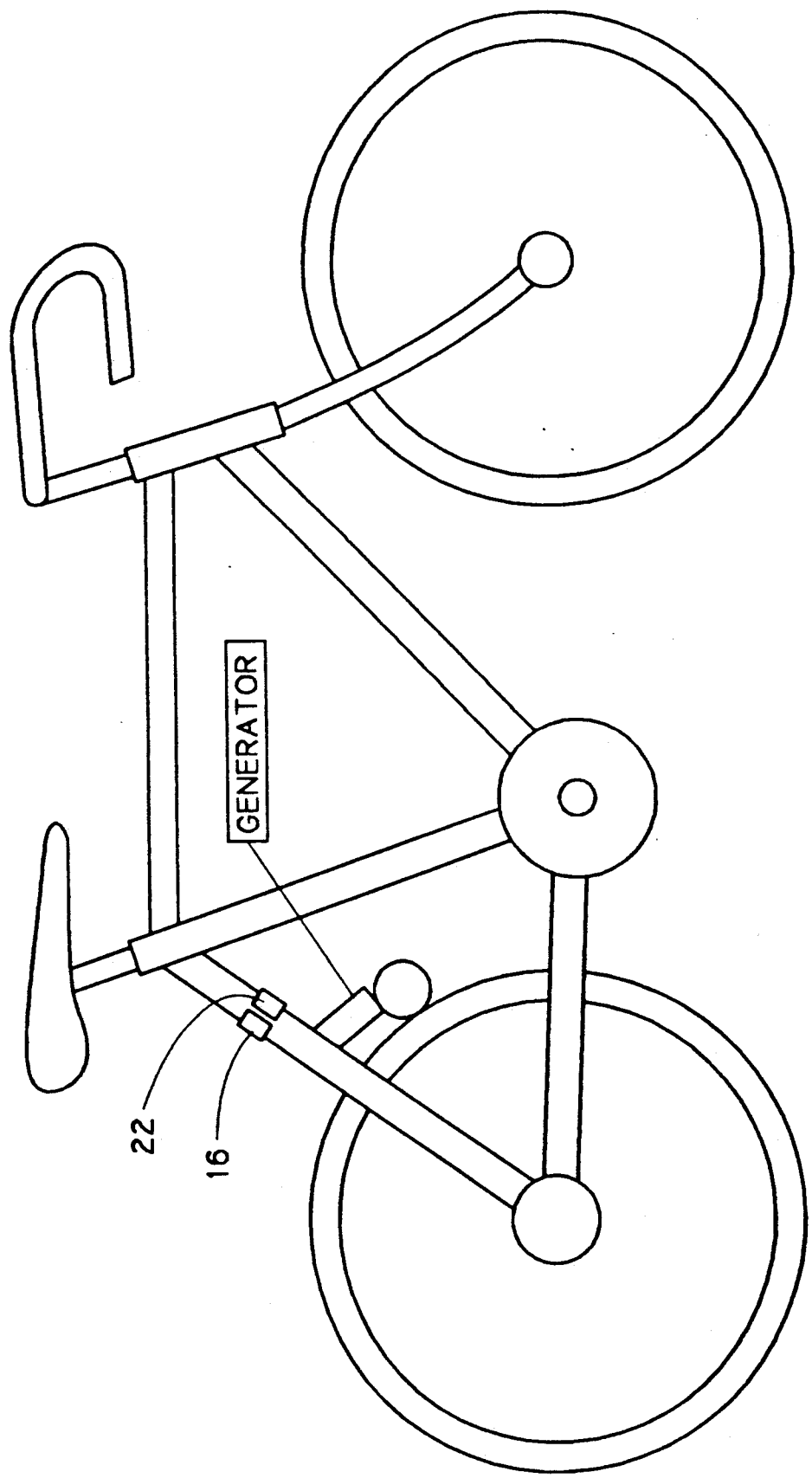
FIG. 3 is an overall view of the generator support bracket of FIG. 1 having a generator attached thereto and mounted over the rear wheel of a bicycle.

Referring first to FIG. 1 a universal bicycle generator mounting bracket in accordance with the above disclosure is shown in perspective view. The invention comprises a pair of opposed tee shaped members 10 and 12, formed of a suitable material such as metal or plastic, having semi cylindrical cup members 14, 16, 18, 20, 22, and 24 disposed at the ends thereof. The two members are clamped together by bolt 26 passing through port 27 and nut 28 and as shown in FIG. 2 secure the bracket to the appropriate parts of the bicycle. Holes 30, 32 and 34 provide the means by which a generator may be securely mounted to frame for engagement with the lateral surface of the rear wheel. Hole 36 allows the brake bolt to pass through the unit to secure the brake and also the bracket to the brake bridge.

Referring to FIG. 2 wherein like numbers refer to like parts of FIG. 1, the invention is shown mounted in conjunction with the appropriate portions of the bicycle frame. Rear fork members 38 and 40 also known as seat supports are positioned to allow for the rear wheel to rotate between them and are separated by brake bridge 42 forming a cross member between the two.

The generator is secured to the mounting bracket by the use of one or more nut and bolt sets to engage the universally positionable attachment arm supplied with most currently available commercial units from bicycle supply shops as is well illustrated in the referenced prior art.

As variations may be made in the above described structure without departing from the intended scope of the invention, the normal structure of the device is hereby defined by the following claim.

What is claimed is:

1. A support bracket for the mounting of a generator over the rear wheel of a bicycle comprising in combination: A pair of opposed tee shaped members, each of said tee shaped members having a vertical portion and a horizontal portion, a semi-cylindrical cup member formed at a bottom terminus of the vertical portion and at each of the horizontal portion, said semi-cylindrical cup members thus forming three opposed pairs of semi-cylindrical cup members for providing clamping engagement to the bicycle frame, a plurality of aligned holes formed through the vertical portion and an aligned hole formed in the horizontal portion, the vertical portion and the horizontal portion respectively receive clamping bolts and generator mounting bolts whereby the support bracket can be clampingly attached to the bicycle frame and the generator can be attached to the support bracket.

* * * * *